United States Patent [19]

Windle

[11] Patent Number: 4,919,059

[45] Date of Patent: Apr. 24, 1990

[54] PLANTING APPARATUS

[76] Inventor: Anthony B. Windle, 'this L Do', Coneygarth Lane, Haxey, Doncaster, England, DN9 2JH

[21] Appl. No.: 242,724

[22] Filed: Sep. 9, 1988

[30] Foreign Application Priority Data

Sep. 10, 1987 [GB] United Kingdom ................. 8721333

[51] Int. Cl.⁵ ............................................ A01C 11/02
[52] U.S. Cl. ..................................... 111/105; 111/110; 111/111
[58] Field of Search ...................... 111/2, 3, 73, 80, 85

[56] References Cited

U.S. PATENT DOCUMENTS

| | | | |
|---|---|---|---|
| 1,657,944 | 1/1928 | Stocker | 111/3 |
| 1,753,017 | 4/1930 | Oppenheim | 111/3 |
| 2,518,570 | 8/1950 | Renault | 111/3 |
| 4,290,373 | 9/1981 | Boots | 111/3 |
| 4,364,316 | 12/1982 | Paladino | 111/3 |

FOREIGN PATENT DOCUMENTS 511455 6/1952 Belgium ................................. 111/3

Primary Examiner—Danton D. DeMille
Attorney, Agent, or Firm—Rodman & Rodman

[57] ABSTRACT

A planting apparatus for planting seedlings in a furrow, comprising a coulter for forming a furrow in the ground as the apparatus is towed, means for introducing a seedling into the coulter and means for ejecting the seedling from the coulter into the furrow, characterized in that means are provided for automatically delivering an intermittent jet of water to clean the apparatus and prevent the build-up of soil. The water also facilitates the planting of the seedling.

10 Claims, 2 Drawing Sheets

PLANTING APPARATUS

This invention relates to planting apparatus, and more particularly to a planting apparatus in which the build-up of dirt therein is minimised.

Planting machines for depositing seedlings into the ground, such as the planting apparatus described in our European patent publication number 0159193, suffer from the drawback that soil adheres to parts of the machinery. This can result in inefficient operation of the planting apparatus and consequently it is necessary to manually clean the apparatus regularly. This problem of soil build-up is particularly acute in areas which have a dry climate, such as Israel and California.

Accordingly, it is an object of the present invention to overcome or reduce the above disadvantages.

According to the present invention there is provided a planting apparatus for planting seedlings in a furrow, comprising a coulter for forming a furrow in the ground as the apparatus is towed, means for introducing a seedling into the coulter and means for ejecting the seedling from the coulter into the furrow, characterised in that means are provided for automatically delivering an intermittent jet of water to clean the apparatus and prevent the build-up of soil.

Preferably the planting apparatus includes a rotatable carousel comprising a plurality of turrets, each turret being adapted to receive a seedling.

each turret preferably has an openable flap at its base which allows the seedling to fall therefrom.

A chute is preferably located below the carousel, and the arrangement is such that when a turret is directly above the chute its flap automatically opens allowing the seedling to fall through the chute.

Preferably a planting cup is situated below the chute substantially at the rear of the coulter so that the seedling comes to rest at the rear of the coulter.

Preferably the planting cup is able to move from a position within the coulter to a position at least partially removed from the coulter thereby removing the seedling from the coulter and depositing it in the furrow.

A water jet is prferably located in the coulter and is connected to a supply, said water jet delivering an intermittent blast of water to the coulter and the seedling.

Preferably the planting cup has three wires extending from the bottom thereof to the base of the coulter, which wires serve to push the seedling out of the coulter and also allow the passage of the jet of water.

The coulter is preferably substantially trapezoidal in cross section and its leading edge is inclined at an angle of approximately 60° to the horizontal.

The coulter preferably has a slot in its base at the rear thereof to facilitate the removal of soil.

The timing of the water jet is preferably controlled by means of a double cam mechanism located in the coulter.

The invention will now be described further, by way of example, only, with reference to and as illustrated in the accompanying drawings, in which.

Figure 1:
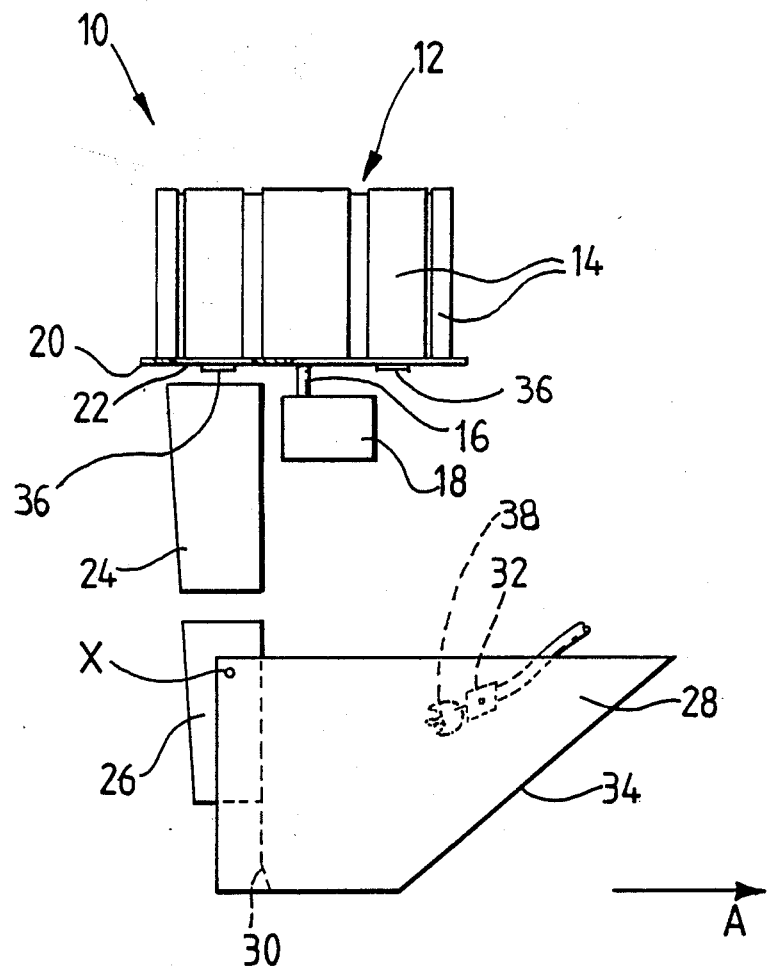
FIG. 1 is a schematic view of a device in accordance with the invention.

Referring to the drawings, a planting apparatus 10 comprises a carousel 12 which includes a plurality of turrets 14. The apparatus generally forms an integral part of a trailer (not shown) which is towed by a tractor or the like in the direction of arrow A. The carousel 12 is rotated by an axle 16 of an angle gear box 18. The gear described in our above-mentioned European patent publication. The carousel 12 rotates with respect to a base 20 which is provided with a hole 22 as can be seen in FIG. 1. When a turret 14 is above the hole its bottom flap schematically indicated at 36 is allowed to open thereby releasing a seedling from the turret. Seedlings may be manually introduced into the turrets by an operative.

Figure 2:
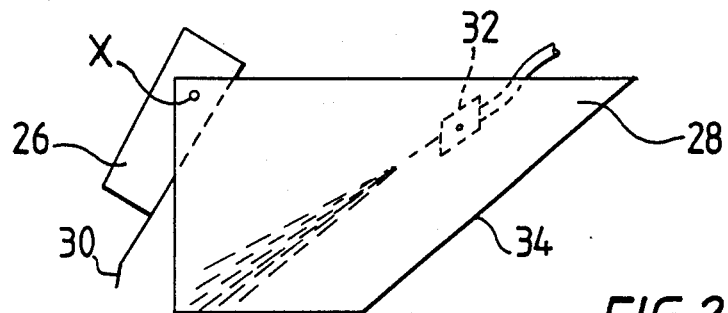
FIG. 2 is an illustration of the coulter showing the position of the planting cup when a seedling has just been removed from the coulter.

The seedling falls through a chute 24 and into a planting cut 26 and locates at the rear of a coulter 28. The planting cup 26 is also coupled to gear box 18 and is caused to pivot about point X periodically as can be seen in FIG. 2. The planting cup 26 has three wires 30 extending from the bottom thereof which serve to push the seedling out of the coulter 28 when the planting cup 26 moves to the position shown in FIG. 2.

Figure 3:
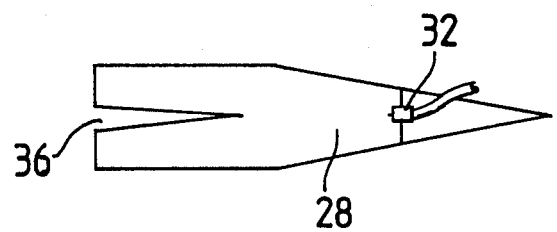
FIG. 3 is a plan view of the coulter showing the location of the water jet.
Figure 4:
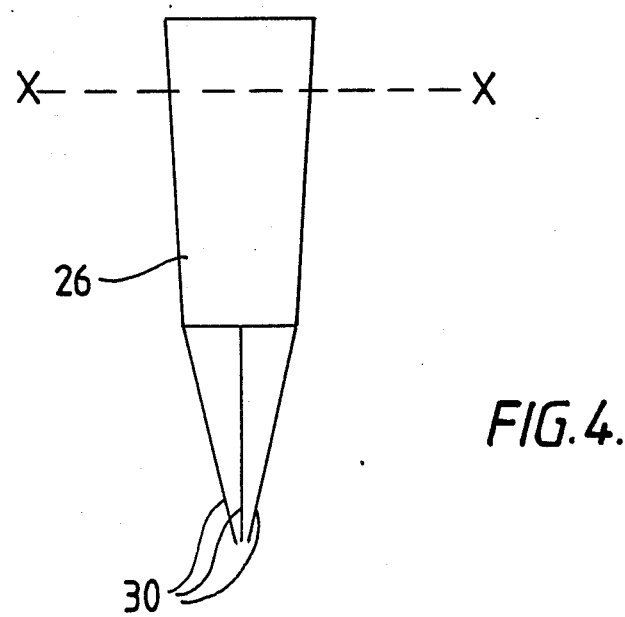
FIG. 4 is an illustration of the planting cup.

A water jet 32 is located inside the coulter (as can be seen in FIGS. 1 to 3) which delivers an intermittent blast of water to the coulter 28 and the seedling. The timing of the jet of water is controlled by a double cam mechanism schematically indicated at 38 and the blast of water is delivered as the seedling is being ejected from the coulter. The blast of water serves two purposes:

(A) it provides an application of water for the seedling, and in this regard the water supply can contain fertiliser, herbicide, pesticide, fungicide or the like for the seedling's benefit; and (B) it removes as much soil as possible from the coulter 28 and planting cup 26 thereby minimizing soil build-up.

The three wires 30 fixed to the bottom of planting cup 26 define two spaces which allow the passage of water therethrough and out of the rear of the coulter.

The coulter 28 has a leading edge 34 which forms a furrow in the ground as the apparatus is towed in the direction of arrow A. The leading edge 34 is inclined at an angle of approximately 60° to the horizontal (a substantially smaller angle than with conventional coulters) which causes an increased pressure at the rear of the coulter because of its shorter flat base which causes dirt to be ejected from the coulter more easily. The base of the coulter is also provided with a slot to further facilitate the removal of soil from said coulter.

A distinct advantage of the invention is that it allows continuous and efficient planting of seedlings without having to continually manually clean the apparatus.

I claim:

1. A planting apparatus for planting seedlings in a furrow, comprising a coulter for forming a furrow in the ground as the apparatus is towed, said coulter having a rear portion and a base portion, means for introducing a seedling into the coulter, including a rotatable carousel comprising a plurality of turrets, each said turret being adapted to receive a seedling, each said turret having a base and an openable flap at its base which allows the seedling to fall therefrom, a chute being located below said carousel such that when one of said turrets is directly above the chute the flap of said one turret automatically opens to allow the seedling to fall through said chute, a planting cup being situated below said chute substantially at the rear portion of said coulter so that the seedling comes to rest at the rear portion of the coulter, means for ejecting the seedling from the coulter into the furrow, and means for automatically delivering an intermittent jet of water to clean the apparatus and prevent the build-up of soil, said planting cup having a bottom portion and said means for ejecting the seedling from the coulter into the furrow including three wires extending from the bottom portion of the planting cup to the base of the coulter, which wires serve to push the seedling out of the coulter and also allow the passage of the jet of water.

2. An apparatus as claimed in claim 1 in which the planting cup is able to move from a position within the coulter to a position at least partially removed from the coulter thereby removing the seedling from the coulter and depositing it in the furrow.

3. An apparatus as claimed in claim 1 wherein said water jet is located in the coulter and connected to a supply, said water jet being capable of delivering an intermittant blast of water to the coulter and the seedling.

4. An apparatus as claimed in claim 1 in which the coulter has a leading edge which forms a furrow in the ground as the apparatus is towed in a forward direction.

5. An apparatus as claimed in claim 4 in which the coulter is substantially trapezoidal in cross section and its leading edge is inclined at an angle of approximately 60° to the horizontal.

6. An apparatus as claimed in claim 4 wherein the coulter has an upper portion and the base of the coulter is flat and shorter than the upper portion, and wherein the leading edge is inclined at an angle of approximately 60° to a horizontal which causes an increased pressure at the rear portion of the coulter because of the shorter flat base of the coulter which causes dirt to be ejected from the coulter more easily.

7. An apparatus as claimed in claim 1 wherein the base of the coulter has a slot at the rear portion of the coulter to facilitate the removal of soil.

8. An apparatus as claimed in claim 1 including a double cam mechanism located in the coulter for controlling the timing of the water jet.

9. An apparatus as claimed in claim 1 wherein said planting cup is rotatable to a tilted position such that said three wires extending from the bottom of said planting cup serve to push the seedling out of the coulter when the planting cup moves to said tilted position.

10. An apparatus as claimed in claim 9 in which the three wires are fixed to the bottom of planting cup and define two spaces which allow the passage of water therethrough and out of the rear of the coulter.

* * * * *